(12) United States Patent
Stolk

(10) Patent No.: US 7,433,139 B2
(45) Date of Patent: Oct. 7, 2008

(54) VARIABLE ATTENUATOR FOR A LITHOGRAPHIC APPARATUS

(75) Inventor: Roland Pieter Stolk, Sprang-Capelle (NL)

(73) Assignee: ASML Netherlands B.V., Veldhoven (NL)

( * ) Notice: Subject to any disclaimer, the term of this patent is extended or adjusted under 35 U.S.C. 154(b) by 174 days.

(21) Appl. No.: 10/924,194

(22) Filed: Aug. 24, 2004

(65) Prior Publication Data

US 2006/0044653 A1    Mar. 2, 2006

(51) Int. Cl.
   *G02B 5/04* (2006.01)
(52) U.S. Cl. .................................. 359/831
(58) Field of Classification Search .......... 359/831–837
   See application file for complete search history.

(56) References Cited

U.S. PATENT DOCUMENTS

| | | | | |
|---|---|---|---|---|
| 4,850,686 A | * | 7/1989 | Morimoto et al. | 359/837 |
| 5,699,160 A | * | 12/1997 | Barenboim et al. | 356/495 |
| 5,822,211 A | * | 10/1998 | Barenboim et al. | 700/166 |
| 6,501,772 B1 | * | 12/2002 | Peterson | 372/10 |
| 6,624,956 B1 | * | 9/2003 | Shechterman | 359/831 |
| 7,020,364 B2 | * | 3/2006 | Ghiron et al. | 385/36 |

* cited by examiner

*Primary Examiner*—Euncha P Cherry
(74) *Attorney, Agent, or Firm*—Pillsbury Winthrop Shaw Pittman, LLP

(57) ABSTRACT

A variable attenuator is provided for selectively attenuating a radiation beam in a lithographic apparatus. The attenuator is generally planar and comprises two wedge shaped prisms formed of refractive material located adjacent to each other, arranged so that the radiation beam passes through both prisms. The attenuator is rotatable to vary the angle at which radiation strikes the prisms, thus varying the transmission at each surface.

26 Claims, 4 Drawing Sheets

VARIABLE ATTENUATOR FOR A LITHOGRAPHIC APPARATUS

BACKGROUND OF THE INVENTION

1. Field of the Invention

The present invention relates to a variable attenuator for use in a lithographic apparatus. The invention also relates to a lithographic apparatus and a method for manufacturing a device. In particular, the invention relates to a variable attenuator for regulating pulse energy density.

2. Background of the Related Art

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticule, may be used to generate a circuit pattern to be formed on an individual layer of the IC. This pattern can be transferred onto a target portion (e.g. comprising part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

It is important to control the radiation dose applied to the substrate. In the Deep Ultraviolet (DV) wavelength region, such as for example 248 nm, 193 nm, or 157 nm, radiation is usually applied using a pulsed exciter laser. In many cases the fluctuation in the energy of individual laser pulses is too large, or the total number of pulses in the slit is too low, to guarantee accurate exposures. This is a particular problem for low doses. In order to overcome this problem, a variable attenuator (VAT) is generally placed in the path of the beam to control the radiation intensity at the wafer stage. A typical variable attenuator is able to reduce the pulse energy to a value between 7% and 90% of its initial value. By decreasing the intensity of each pulse the total number of pulses required is increased, and deviations between individual pulses can be averaged out more effectively.

Known variable attenuators comprise a transmissive substrate (e.g. a quartz plate) coated with an "angle-sensitive" layer whose transmission is dependent on the angle of radiation incident upon it. The plate can be rotated to vary the transmission of the attenuator in a range of, typically, approximately 7-90%.

As mentioned above, two exposure types can be distinguished: static exposures ("stepper" apparatus) and scanning exposures. The way the variable attenuator is used during these types of exposures is different. In the case of static exposures the variable attenuator switches between its maximum and minimum transmission points, whereas during scanning exposures the transmission can be anywhere between these extremes.

A static exposure starts with the variable attenuator at its maximum transmission. As the integrated dose increases, the dose control algorithm evaluates whether the next pulse (including its inherent energy error) will still fit within the dose ready window. If so, the next pulse will be fired. If not, the exposure is briefly interrupted to move the variable attenuator from the maximum to the minimum transmission. From this point on, the exposure is finished with low-energy pulses until the integrated dose fits within the dose ready window.

Since not all parts of the die are exposed simultaneously during a scanning exposure, the variable attenuator cannot be used in the same way, as different pulses affect different parts of the die. Therefore, the transmission of the variable attenuator may not be changed during scanning exposures. A required set point is calculated and set before the exposure starts, depending on the scan time (i.e. wafer stage speed), laser frequency, nominal pulse energy, and number of pulses. As the set point of the variable attenuator is fixed during the exposure, a dose control algorithm manipulates the energy of each laser pulse.

As mentioned above, currently available attenuators are capable of providing a transmission range of approximately 7-90%. It would be desirable to provide an attenuator capable of transmitting over a range of 0-100%. At the top end of this range, the additional transmission could increase the throughput. At the lower end of the range, the greater attenuation would enable low doses to consist of more pulses, improving the averaging between pulses.

Furthermore, variable attenuators currently in use suffer from in homogeneity problems with the angle-sensitive coating. This results in a change in the transmission of the attenuator as the beam moves over its surface. This change should be compensated for by the laser changing the energy provided in each pulse. Since the available range of energy per pulse is limited, this can lead to dose errors at the wafer level.

SUMMARY OF THE INVENTION

One aspect of embodiments of the present invention to provides a variable attenuator which does not suffer from variations in transmission caused by in homogeneity in an angle-sensitive coating.

Another aspect of embodiments of the present invention to provide a variable attenuator with an increased transmission range.

According to an aspect of the invention, there is provided a variable attenuator for controllably attenuating a radiation beam in a lithographic apparatus, the attenuator being generally planar and comprising two wedge shaped prisms formed of refractive material located adjacent to each other, arranged so that the radiation beam passes through both prisms. The prisms may for example be separated by an air gap, although it will be appreciated that other materials or a vacuum may be located in the gap.

In a particular arrangement, a first prism comprises a first face and a second face offset from parallel with each other by a prism angle, a second prism comprises a first face and a second face offset from parallel with each other by the same prism angle, and the second face of the first prism is located adjacent and substantially parallel to the first face of the second prism so that the first face of the first prism and second face of the second prism are substantially parallel. A suitable prism angle is approximately 5°. The prisms can be rigidly attached to one another.

The attenuator may be rotatable so as to change the angle at which the radiation beam strikes the prisms. This change in angle causes a change in transmission at each face of the prisms, changing the overall transmission of the attenuator. The refractive index of the prisms is chosen to provide a transmission range over suitable angles, and a suitable value for this refractive index is approximately 1.5. The prisms may be formed from calcium fluoride or quartz, for example. The prisms are in certain embodiments uncoated, although it will be appreciated that coatings may be applied to the surfaces of the prisms to control the transmission and reflection characteristics of the surfaces.

According to another aspect of the invention, there is provided a lithographic apparatus comprising an illumination system configured to condition a radiation beam; a support constructed to support a patterning device, the patterning device being capable of imparting the radiation beam with a pattern in its cross-section to form a patterned radiation beam; a substrate table constructed to hold a substrate; a projection system configured to project the patterned radiation beam onto a target portion of the substrate; and a generally planar variable attenuator in the path of the radiation beam for controllably attenuating the radiation beam, the variable attenuator comprising two wedge-shaped prisms adjacent to each other so that the radiation beam passes through both prisms and being rotatable so as to vary the angle at which the beam strikes the prisms.

The radiation beam may be plane polarized, and the attenuator arranged so that the polarization direction is substantially parallel to the plane of incidence of the radiation beam on the attenuator (i.e. the radiation is in the p-polarization state). If the angle of incidence of radiation on the attenuator is near the Brewster angle the transmission at each face is near 100%, and thus the transmission of the attenuator is near 100%. If the angle of incidence is far from the Brewster angle then the transmission at each face is considerably less than 100%. Since there are four faces, each having a low transmission, the overall transmission is then very low.

According to another aspect of the invention, there is provided a device manufacturing method comprising the steps of: providing a substrate; providing a projection beam of radiation using an illumination system; passing the projection beam of radiation through a generally planar variable attenuator comprising two adjacent wedge-shaped prisms formed of refractive material; using a patterning device to impart the projection beam with a pattern in its cross-section; and projecting the patterned beam of radiation onto a target portion of the substrate.

According to another aspect of the invention, there is provided a method of selectively attenuating a radiation beam in a lithographic apparatus, comprising passing the beam through a generally planar variable attenuator comprising two prisms arranged adjacent one another with an air gap there between so that the radiation beam passes through both prisms.

According to another aspect of the invention, there is provided a variable attenuator for selectively attenuating a radiation beam in a lithographic apparatus, the attenuator comprising: a first prism comprising a first face and a second face offset from parallel with each other by a prism angle; and a second prism comprising a first face and a second face offset from parallel with each other by the prism angle; wherein the first and second prisms are rigidly attached to one another in such a way that the first face of the second prism is located close to and substantially parallel to the second face of the first prism so that the first face of the first prism and second face of the second prism are substantially parallel.

Figure 1:
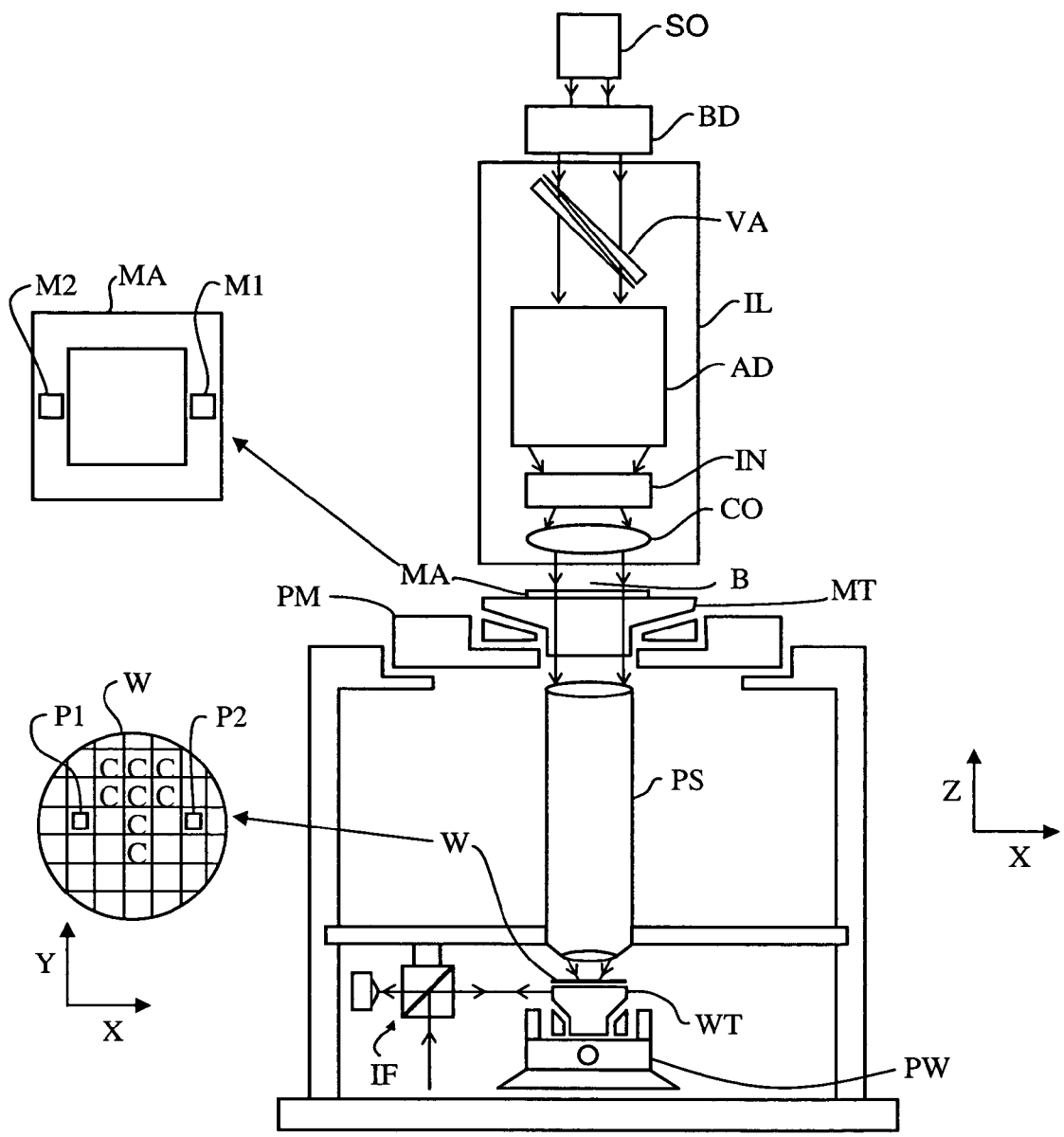
FIG. 1 depicts a lithographic apparatus.

While the invention is susceptible to various modifications and alternative forms, specific embodiments thereof have been shown by way of example in the drawings and will herein be described in detail. It should be understood, however, that this specification is not intended to limit the invention to the particular forms disclosed herein, but on the contrary, the intention is to cover all modifications, equivalents, and alternatives falling within the scope of the invention, as defined by the appended claims.

DETAILED DESCRIPTION OF EMBODIMENTS OF THE INVENTION

FIG. 1 schematically depicts a lithographic apparatus. The apparatus comprises:
  an illumination system (illuminator) IL configured to condition a radiation beam B (e.g. UV radiation).
  a support structure (e.g. a mask table) MT constructed to support a patterning device (e.g. a mask) MA and connected to a first positioned PM configured to accurately position the patterning device in accordance with certain parameters;
  a substrate table (e.g. a wafer table) WT constructed to hold a substrate (e.g. a resist-coated wafer) W and connected to a second positioned PW configured to accurately position the substrate in accordance with certain parameters; and
  a projection system (e.g. a refractive projection lens system) PS configured to project a pattern imparted to the radiation beam B by patterning device MA onto a target portion C (e.g. comprising one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure supports, i.e. bears the weight of, the patterning device. It holds the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables (and/or two or more mask tables). In such "multiple stage" machines the additional tables may be used in parallel, or preparatory steps may be carried out on one or more tables while one or more other tables are being used for exposure.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIG. 1, the illuminator IL receives a radiation beam from a radiation source SO. The source and the lithographic apparatus may be separate entities, for example when the source is an exciter laser. In such cases, the source is not considered to form part of the lithographic apparatus and the radiation beam is passed from the source SO to the illuminator IL with the aid of a beam delivery system BD comprising, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may comprise an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as an integrator IN and a condenser CO. The illuminator may be used to condition the radiation beam, to have a desired uniformity and intensity distribution in its cross-section.

The radiation beam B is incident on the patterning device (e.g., mask MA), which is held on the support structure (e.g., mask table MT), and is patterned by the patterning device. Having traversed the mask MA, the radiation beam B passes through the projection system PS, which focuses the beam onto a target portion C of the substrate W. With the aid of the second positioned PW and position sensor IF (e.g. an interferometer device, linear encoder or capacitive sensor), the substrate table WT can be moved accurately, e.g. so as to position different target portions C in the path of the radiation beam B. Similarly, the first positioned PM and another position sensor (which is not explicitly depicted in FIG. 1) can be used to accurately position the mask MA with respect to the path of the radiation beam B, e.g. after mechanical retrieval from a mask library, or during a scan. In general, movement of the mask table MT may be realized with the aid of a long-stroke module (coarse positioning) and a short-stroke module (fine positioning), which form part of the first positioned PM. Similarly, movement of the substrate table WT may be realized using a long-stroke module and a short-stroke module, which form part of the second positioned PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The depicted apparatus could be used in at least one of the following modes:

1. In step mode, the mask table MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the mask table MT and the substrate table WT are scanned synchronously while a pattern imparted to the radiation beam is projected onto a target portion C (i.e. a single dynamic exposure). The velocity and direction of the substrate table WT relative to the mask table MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to mask less lithography that utilizes programmable patterning device, such as a programmable mirror array of a type as referred to above.

Combinations and/or variations on the above described modes of use or entirely different modes of use may also be employed.

A variable attenuator VA is located in the path of the radiation beam B to control the intensity of the radiation striking the substrate W. As shown in FIG. 1, the variable attenuator is depicted as being located at the input of the illumination system IL, although it will be appreciated that it could equally well be located at any location where the beam of radiation is substantially parallel and before it has reached the mask MA.

FIG. 2 is a schematic diagram showing the construction of the variable attenuator VA. The variable attenuator VA comprises first and second prisms 1, 2 rigidly attached together, for example using glue 3 at the edges of the prisms 1, 2. Both prisms are made from a material transparent to the radiation used, but having a refractive index n>1. A suitable material is calcium fluoride, $CaF_2$, and a suitable refractive index is n=1.5.

The first prism 1 includes first and second faces 4, 5 offset from each other by a prism angle $\alpha$. The second prism 2 includes first and second faces 6, 7 offset from each other by the same prism angle $\alpha$. The second face 5 of the first prism and the first face 6 of the second prism are located close to each other and parallel, with the prisms arranged so that the thick end of the first prism 1 is level with the thin end of the second prism 2, with the prism angles a of the first and second prisms at opposite ends of the attenuator VA. This results in a generally substantially planar arrangement, that is, the attenuator has a substantially constant overall thickness, with the first face 4 of the first prism and the second face 7 of the second prism being parallel to one another and forming the outside faces of the attenuator VA. The attenuator is rotatable in the X-Z plane (the plane of the paper), shown by the arrows 8.

When a beam of electromagnetic radiation is incident on an interface and refracted, the direction of the beam following refraction is given by Snell's law:

$$\frac{\sin\theta_i}{\sin\theta_t} = \frac{n_t}{n_i}$$

where $\theta_i$ is the angle of the incident ray, $\theta_t$ is the angle of the transmitted ray, $n_i$ is the refractive index of the medium through which the ray is propagated before striking the interface, and $n_t$ is the medium through which the ray is propagated after refraction.

Figure 2A:
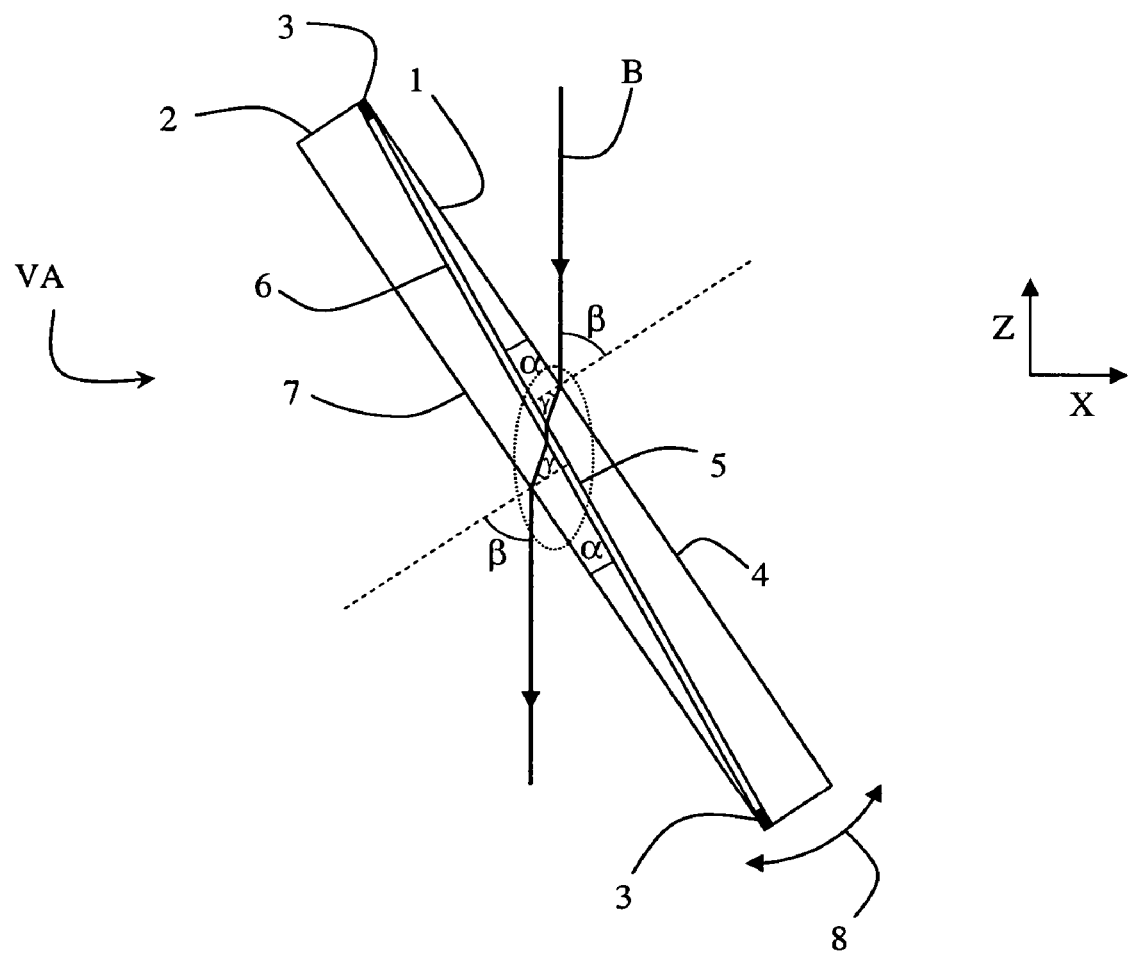
FIG. 2A depicts a variable attenuator in accordance with the invention.
Figure 2B:
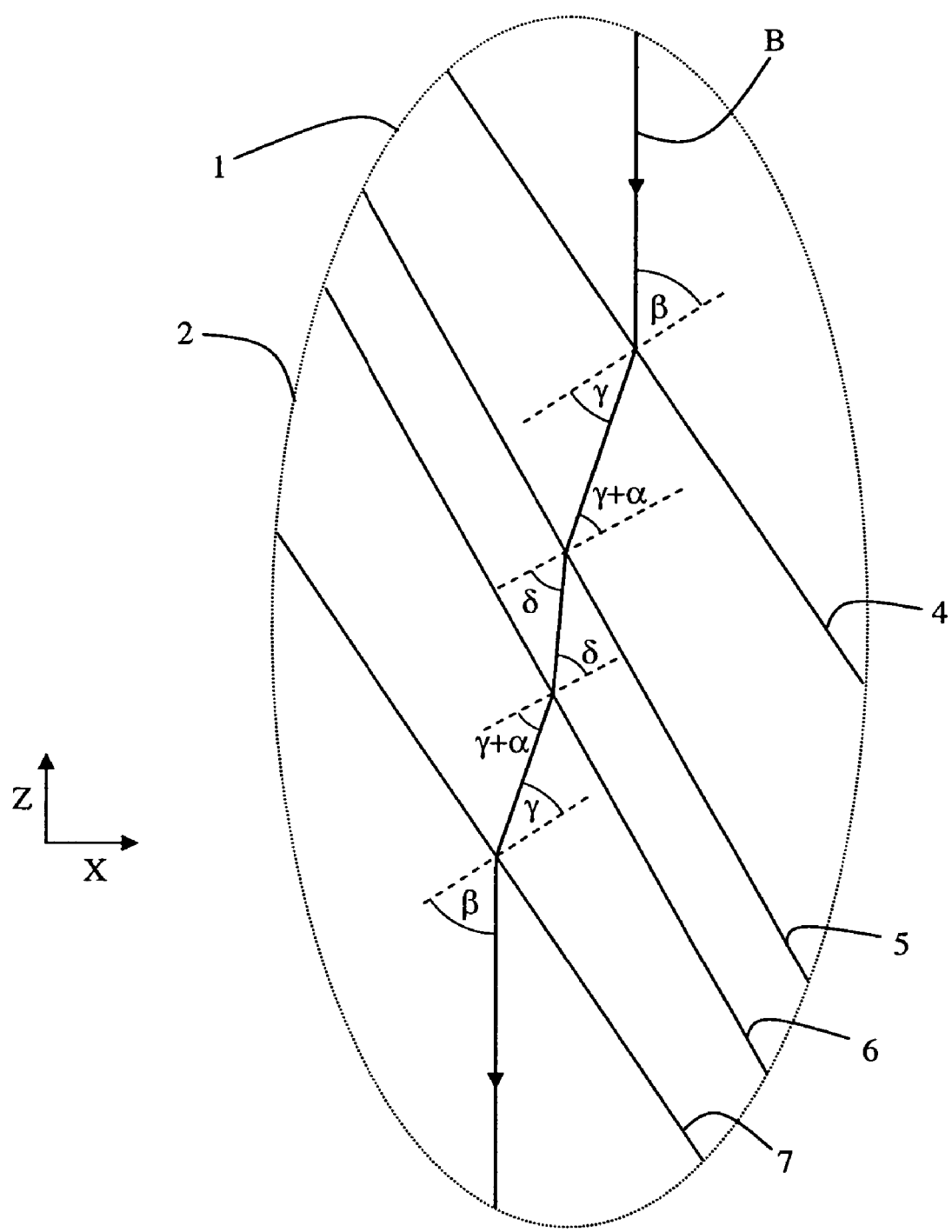
FIG. 2B shows detail of the attenuator of FIG. 2A, illustrating the path of radiation through the attenuator.

FIG. 2B is an enlargement of the central portion of FIG. 2A, and shows the path followed by a ray of radiation in the radiation beam B, which strikes the first surface 4 of the first prism at an incident angle $\beta$. The beam initially travels through air ($n_i \approx 1$) or a $$\sin\gamma = \frac{\sin\beta}{n_p},$$

where $n_p$ is the refractive index of the prism.

This refracted beam strikes the second face 5 of the first prism at an angle ($\gamma+\alpha$), and emerges into the air (or vacuum) gap between the prisms 1, 2 at an angle $\delta$ to the second face 5 of the first prism given by:

$$\sin\delta = n_p \sin(\gamma+\alpha).$$

By symmetry, the beam B then strikes the first face 6 of the second prism at the angle $\delta$ determined above, and is refracted to an angle ($\gamma+\alpha$) with that face. The beam strikes the second face 7 of the second prism at angle $\gamma$, and exits the second prism (and the attenuator) at angle $\beta$.

The radiation beam B can for example be formed by an exciter laser that generates radiation with a linear or planar polarization state. Radiation is provided to the attenuator in the p-polarization state, i.e. radiation in which the electric field oscillates in a direction parallel to the plane of incidence. In FIGS. 2A and 2B, the plane of incidence is the X-Z plane (the plane of the paper), and the direction of polarisation for radiation in the p-polarization state is the X-direction. In general, when radiation strikes an interface between two dielectric materials, some is reflected and some transmitted. For radiation in the p-polarization state, the transmittance at a surface is given by Fresnel's law:

$$T_\| = 1 - R_\| = 1 - r_\|^2 = 1 - \left(\frac{\tan(\theta_i - \theta_t)}{\tan(\theta_i + \theta_t)}\right)^2$$

where $T_\|$ is the transmission of radiation intensity polarized parallel to the plane of incidence;

$R_\|$ is the reflection of radiation intensity polarized parallel to the plane of incidence; and $r_\|$ is the reflection of the radiation electric field vector.

It is thus straightforward to determine the transmittance of radiation in the p-polarization state at each of the four surfaces 4, 5, 6, 7 when the angles $\alpha$, $\beta$, $\gamma$ and $\delta$ are known $\gamma$ and $\delta$ can of course be determined using Snell's law as described above. At the first surface 4, $\theta_i=\beta$ and $\theta_t=\gamma$. At the second surface 5, $\theta_i=\gamma+\alpha$ and $\theta_t=\delta$. At the third surface 6 (first face of the second prism 2), $\theta_i=\delta$ and $\theta_t=\gamma+\alpha$. At the fourth surface 7 (second face of the second prism), $\theta_i=\gamma$ and $\theta_t=\beta$. The overall transmission of the attenuator is the product of the transmissions at each of the four surfaces 4, 5, 6, 7.

Figure 3A:
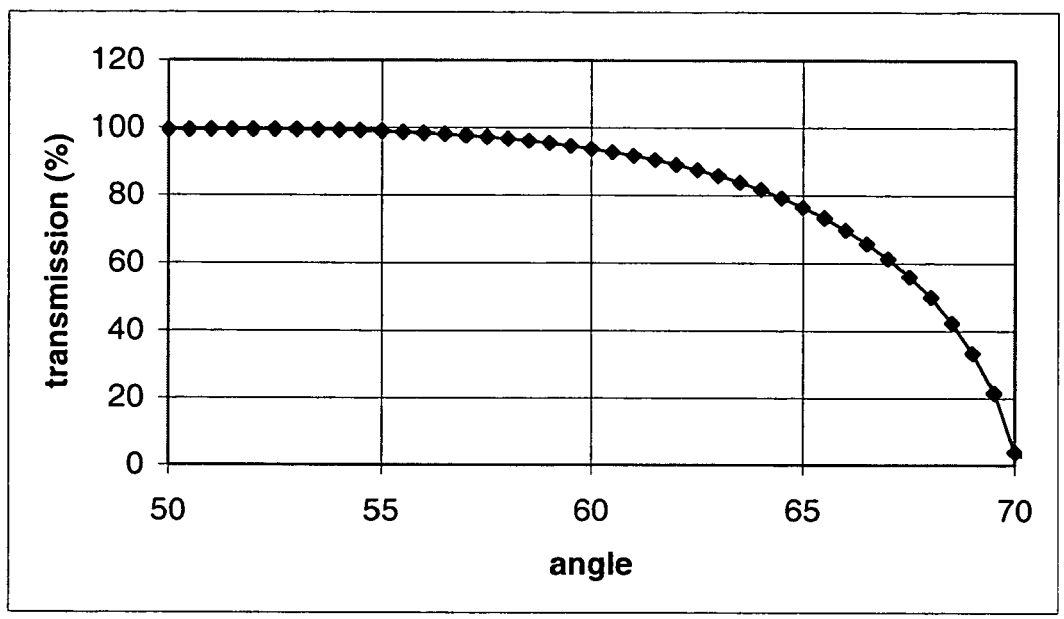
FIGS. 3A and 3B are simulations showing the theoretical variation of transmission with the angle of incidence of radiation striking the attenuator of FIG. 2.

The overall transmission of the attenuator is thus a function of the angle of incidence $\beta$, prism angle $\alpha$ and prism refractive index $n_p$. For any given attenuator VA, $\alpha$ and $n_p$ are fixed, but $\beta$ can be varied by rotating the attenuator in the X-Z plane shown in FIG. 2A. The prism refractive index $n_p$ and prism angle $\alpha$ may be chosen to ensure that a full range of transmission from 0% to very nearly 100% can be achieved by a variation in angle of 10-20°. For example, FIG. 3A shows a simulated transmission curve for a variable attenuator having prism refractive index $n_p=1.5$ and prism angle $\alpha=3°$. The curve is generated using Snell's law and the Fresnel equation described above. It can easily be seen that the theoretical transmission varies in a smooth curve from near 100% at $\beta=55°$ to 0% at $\beta=70°$.

Figure 3B:
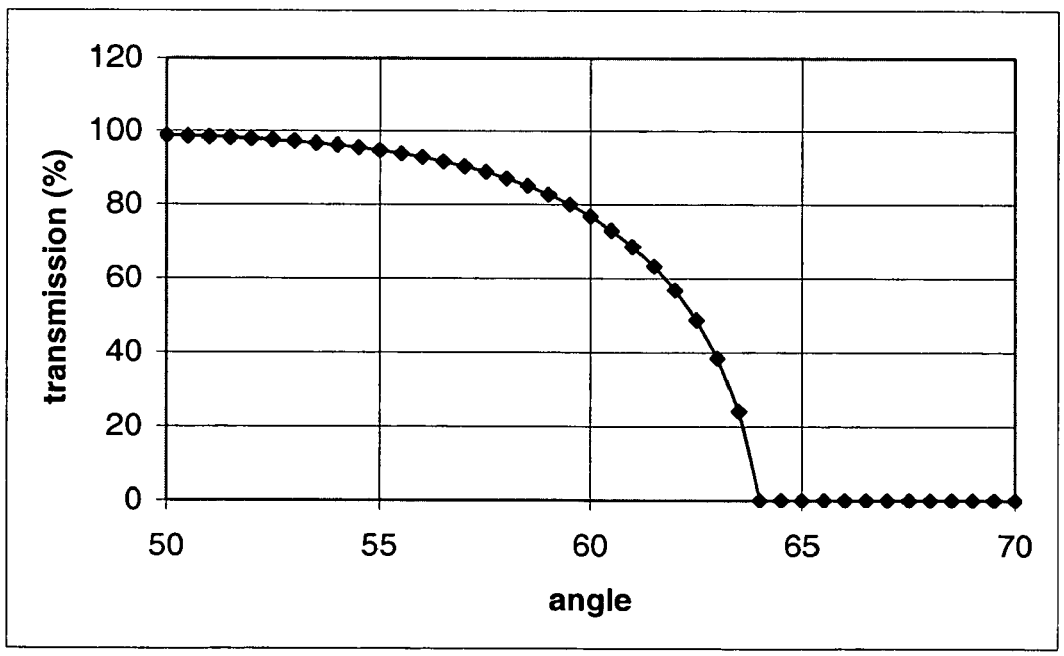

Similarly, FIG. 3B shows a simulated transmission curve for a variable attenuator having prism refractive index $n_p=1.5$ and prism angle $\alpha=5°$. Now the theoretical transmission varies from near 100% at $\beta=50°$ to 0% at $\beta=64°$.

It will be noted that in each of these cases the transmission is near 100% when the angle of incidence $\beta \approx 50°$. This arises because, for radiation in the p-polarization state encountering an interface, when $\theta_i+\theta_t=90°$, no radiation is reflected and the transmission is (theoretically) exactly 100%. This occurs at an angle of incidence known as Brewster's angle $\theta_p$, which is given by $\tan\theta_p=n_p$. For a prism having refractive index $n_p=1.5$, $\theta_p=56.3°$. At angles near Brewster's angle the transmission is still near 100%. Since airs small, if $\beta$ is close to Brewster's angle, then so is $\delta$, and the transmission is near 100% at all four surfaces 4, 5, 6, 7.

The change from near 100% transmission to 0% transmission over a small variation in the incidence angle $\beta$ means that only a small rotation is necessary to switch the attenuator between 0% and near 100% transmission. This facilitates rapid switching of the attenuator between minimum and maximum attenuation. Furthermore, since the attenuation is provided by the inherent properties of faces at different angles there is no need to provide angle-dependent coatings,. with their associated homogeneity problems. Furthermore, since coatings are not necessary, the same variable attenuator may be used with radiation of different wavelengths, for example 248 nm, 193 nm and 157 nm. In addition, the range of attenuation made available by the attenuator is greater than that provided by previously known variable attenuators.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g. having a wavelength of or about 365, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

The invention claimed is:

1. A variable attenuator constructed and arranged to controllably attenuate a radiation beam in a lithographic apparatus, comprising:
   two wedge-shaped prisms formed of refractive material located proximate each other, arranged so that in use the radiation beam passes through both prisms and arranged to attenuate the radiation beam, each prism having a first face configured to receive the radiation beam and a second face configured to transmit the radiation beam, and
   wherein the first face of one prism is substantially parallel to the second face of the other prism which imparts to the attenuator a substantially planar configuration.

2. The attenuator of claim 1, wherein the prisms are separated by a gap.

3. The attenuator of claim 1, wherein:
   a first prism of the two prisms comprises the first face and the second face offset from parallel with each other by a prism angle;
   a second prism of the two prisms comprises the first face and the second face offset from parallel with each other by the prism angle; and
   the second face of the first prism is located adjacent and substantially parallel to the first face of the second prism so that the first face of the first prism and the second face of the second prism are substantially parallel.

4. The attenuator of claim 3, wherein the prism angle is in the range of approximately 3° to approximately 5°.

5. The attenuator of claim 1, wherein the refractive index of each prism is approximately 1.5.

6. The attenuator of claim 1, wherein each prism is formed from calcium fluoride or quartz.

7. The attenuator of claim 1, wherein the attenuator is rotatable so as to change the angle at which the radiation beam strikes the prisms.

8. The attenuator of claim 1, wherein the prisms are rigidly connected to each other.

9. The attenuator of claim 1, wherein the prisms are uncoated.

10. A lithographic apparatus comprising:
    an illumination system configured to condition a radiation beam;
    a support constructed to support a patterning device, the patterning device being capable of imparting the radiation beam with a pattern in its cross-section to form a patterned radiation beam;
    a substrate table constructed to hold a substrate;
    a projection system configured to project the patterned radiation beam onto a target portion of the substrate; and
    a substantially planar variable attenuator in the path of the radiation beam, controllable to variably attenuate the radiation beam, the variable attenuator comprising two wedge-shaped prisms proximate each other so that, in operation, the radiation beam passes through both prisms and the attenuator being rotatable so as to vary the angle at which the radiation beam strikes the prisms so as to attenuate the radiation beam,
    wherein the radiation beam is linearly polarised so that the polarisation direction is substantially parallel to the plane of incidence of the radiation beam on the attenuator.

11. The apparatus of claim 10, wherein the variable attenuator is rotatable over a range of 20°.

12. The apparatus of claim 11, wherein the variable attenuator is rotatable between a first position, in which the radiation beam strikes the attenuator at an angle close to a Brewster angle of the material from which the prisms are formed, and a second position, in which the radiation beam strikes the attenuator at an angle far from the Brewster angle of the material from which the prisms are formed.

13. A device manufacturing method comprising:
projecting a radiation beam towards a substrate; and
passing the radiation beam through a substantially planar variable attenuator comprising two wedge-shaped prisms formed of refractive material to attenuate the radiation beam, said prisms located proximate each other and each prism having a first face configured to receive the radiation beam and a second face configured to transmit the radiation beam, wherein the first face of one prism is substantially parallel to the second face of the other prism.

14. The method of claim 13, further comprising rotating the variable attenuator so as to vary the attenuation of the radiation beam.

15. The method of claim 13, wherein the prisms are separated by a gap.

16. The method of claim 13, wherein:
a first prism of the two adjacent prisms comprises the first face and the second face offset from parallel with each other by a prism angle;
a second prism of the two adjacent prisms comprises the first face and the second face offset from parallel with each other by the prism angle; and
the second face of the first prism is located adjacent and substantially parallel to the first face of the second prism so that the first face of the first prism and the second face of the second prism are substantially parallel.

17. The method of claim 16, wherein the prism angle is in the range of approximately 3° to approximately 5°.

18. The method of claim 13, wherein the refractive index of each prism is approximately 1.5.

19. The method of claim 13, wherein each prism is formed from calcium fluoride or quartz.

20. The method of claim 13, wherein the prisms are rigidly connected to each other.

21. The method of claim 13, wherein the radiation beam is substantially plane polarised.

22. The method of claim 21, wherein the direction of polarisation of the radiation beam is substantially parallel to the plane of incidence of the radiation beam on the attenuator.

23. The method of claim 13, wherein the prisms are uncoated.

24. A device manufacturing method comprising:
passing a projection beam of radiation through a substantially planar variable attenuator comprising two adjacent wedge-shaped prisms formed of refractive material to attenuate the projection beam, each prism having a first face configured to receive the radiation beam and a second face configured to transmit the radiation beam, wherein the first face of one prism is substantially parallel to the second face of the other prism;
using a patterning device to impart the projection beam with a pattern in its cross-section; and
projecting the patterned beam of radiation onto a target portion of a substrate.

25. A method of controllably attenuating a radiation beam in a lithographic apparatus, comprising passing the beam through a substantially planar variable attenuator comprising two prisms arranged adjacent one another with a gap therebetween such that the radiation beam passes through both prisms and is attenuated, wherein each prism has a first face configured to receive the radiation beam and a second face configured to transmit the radiation beam, wherein the first face of one prism is substantially parallel to the second face of the other prism.

26. A variable attenuator for selectively attenuating a radiation beam in a lithographic apparatus, the attenuator comprising:
a first prism comprising a first face and a second face offset from parallel with each other by a prism angle; and
a second prism comprising a first face and a second face offset from parallel with each other by the prism angle;
wherein the first and second prisms are rigidly connected to one another in such a way that the first face of the second prism is located proximate and substantially parallel to the second face of the first prism such that the first face of the first prism and the second face of the second prism are substantially parallel and the first and second prisms are arranged to attenuate the radiation beam.

* * * * *